(12) United States Patent
Lawson

(10) Patent No.: US 7,086,171 B2
(45) Date of Patent: Aug. 8, 2006

(54) TEMPLATE FOR POSITIONING VENTS OR BOOTS FOR AN HVAC SYSTEM

(76) Inventor: Mark Lawson, 1264 Riddle Rd., Pauline, SC (US) 29374

( * ) Notice: Subject to any disclaimer, the term of this patent is extended or adjusted under 35 U.S.C. 154(b) by 0 days.

(21) Appl. No.: 10/882,106

(22) Filed: Jun. 30, 2004

(65) Prior Publication Data
US 2006/0000102 A1    Jan. 5, 2006

(51) Int. Cl.
*G01B 5/14* (2006.01)
(52) U.S. Cl. .......................... 33/562; 33/566
(58) Field of Classification Search .......... 33/562, 33/1 G, 613, 645, 563, 565, 566
See application file for complete search history.

(56) References Cited

U.S. PATENT DOCUMENTS

| | | | |
|---|---|---|---|
| 1,612,455 A | | 12/1926 | McGeorge |
| D134,627 S | * | 12/1942 | Harrison ...................... 33/565 |
| 2,579,857 A | * | 12/1951 | Premo ......................... 33/565 |
| 3,842,510 A | | 10/1974 | Elliot |
| 3,855,924 A | | 12/1974 | Morse, Jr. |
| 4,228,592 A | | 10/1980 | Badger |
| 4,338,724 A | | 7/1982 | Johnson |
| 4,345,381 A | | 8/1982 | Brislin |
| 4,361,964 A | | 12/1982 | Hennessee |
| 5,040,304 A | | 8/1991 | Jackson |
| 5,172,483 A | | 12/1992 | Yocono, Sr. et al. |
| 5,188,013 A | | 2/1993 | Cardinale |
| 5,195,249 A | | 3/1993 | Jackson |
| 5,222,303 A | | 6/1993 | Jardine |
| 5,396,710 A | * | 3/1995 | Battaglia ...................... 33/563 |
| 5,577,328 A | * | 11/1996 | Kerry, Sr. ..................... 33/563 |
| 5,706,586 A | | 1/1998 | Payne |
| 6,272,758 B1 | * | 8/2001 | Wheeler ....................... 33/1 G |
| 2002/0078581 A1 | * | 6/2002 | Nejad-Sattari ................ 33/563 |
| 2003/0115767 A1 | * | 6/2003 | Wedekind et al. ............. 33/566 |

* cited by examiner

*Primary Examiner*—Christopher W. Fulton
(74) *Attorney, Agent, or Firm*—Dority & Manning, P.A.

(57) ABSTRACT

A template for locating the placement of the vents for an HVAC system is provided. The template includes a body defining a first set of parallel edges. Further, the body defines longitudinal and latitudinal walls of a rectangular aperture. The longitudinal walls run parallel to the first set of parallel edges and the latitudinal walls run perpendicular to the first set of parallel edges. The rectangular aperture is useable to define a location of a vent for an HVAC system on at least one of a floor or wall. At least one adjustment aperture is defined by the body beside at least one of the latitudinal or longitudinal walls to accommodate the defining of a location for a vent having at least one of different width or length than provided by the rectangular aperture.

27 Claims, 3 Drawing Sheets

TEMPLATE FOR POSITIONING VENTS OR BOOTS FOR AN HVAC SYSTEM

FIELD OF INVENTION

The present invention relates generally to a tool for helping install an HVAC system. More particularly, the invention relates to a template used for defining a location of a boot and vent register for an HVAC system within a building.

BACKGROUND OF THE INVENTION

When installing an HVAC system in a house, building or other facility under construction, an important step is to locate the positions of HVAC boots, vents, and vent registers for supplying and returning air within the internal structure of the building. In new construction, the designation of where the boots will be placed may be done before sheetrock is placed on the walls and ceiling and before the floor is installed on the subfloor. When siting these positions for HVAC boots, a worker will use a tape measure and straightedge to trace out the position for the HVAC boot. At a later time, a hole will be cut in the floor for the HVAC boot around the position that has been traced and the boot will be inserted into the newly defined hole.

The defining of the positions for an HVAC boot with a straightedge and tape measure can be time consuming and the opportunity for inaccuracies in defining a location may be great. For example, in new construction, the worker laying out the position of the HVAC boots on a floor or subfloor must take into consideration the depth of the sheetrock used on the wall as well as the size of the molding used at the baseboard between the wall and floor. Similarly, if a worker is defining a position of an HVAC vent on a sheetrocked wall, the worker has to take into consideration the depth of the floor which will be placed on the subfloor as well as the height of the molding used for the baseboard around the bottom of the wall next to the floor. If such considerations are not taken, the placement of the position for the HVAC vent may be inaccurate causing a reworking of not only the position of the HVAC vent but possibly the subflooring, flooring or sheetrock, depending on the location of the vent.

This "roughing-in" for position of an HVAC boot is a time consuming task. Further, as stated above, the opportunity for an imperfect placement such as a crooked placement or placements which interfere with the molding around a wall happen all too often when the HVAC installer uses a tape measure and a straightedge to define the position. It is often easy to misalign the straightedge or miss-mark the position for the boot or vent using a tape measure.

The same problem often occurs for installations of boots in ceiling positions in new construction sites. The position may be marked along the trusses of the ceiling before sheetrock is placed over the ceiling. The vent is then placed between trusses in the ceiling before the sheetrock is installed. For such an installment, a hole is cut in the sheetrock where the boot is located once the sheetrock is installed. In certain situations, the vent will be positioned wrong. For example, such occurrences may happen due to the installer not understanding the width of the molding that will be placed along the ceiling and corresponding wall, or due to the indecision of the owner of the premises who may decide at a later date to have different size moldings. To correct his misplacements of the boots, the installer of the HVAC will have to cut into the molding, creating an unsightly divot in the molding. In the alterative, the installer will have to cut through the sheetrock and move the boot to a position further from the wall.

In both floor vents and ceiling vents, it is preferable to have the vent closer to the wall for circulation purposes and, for the floor vent, to prevent from interfering with travel lanes within the building. By having the vent in the ceiling closer to the wall the air flows down around the wall and circulates into the room better than if the vent was placed in the center of the wall. Also, such a placement is more aesthetically pleasing and less intrusive than if such a vent was placed in the middle of the room. So weighing the concerns of placing the vent close to the wall while at the same time not interfering with possible molding or baseboards placed around the ceiling and floor is a major concern for HVAC system installers.

Therefore, a need exists for a tool that can increase the efficiency for designating the positions of both supply and return vents and boots within a new construction site as well as for deciding positions for such boots in existing buildings. Such a tool could help decrease the amount of inaccurate boot placements as well as the amount of time which is needed to site the locations for such boots and vents. By increasing the efficiency by reducing the amount of time needed to define locations for the vents and boots as well as eliminating the need for reworking such locations for inaccurate positions, the cost for installation of such HVAC systems can decrease greatly.

SUMMARY OF THE INVENTION

The present subject matter recognizes and addresses the above briefly discussed drawbacks, and others of the above-described process for defining locations of vents for an HVAC system. Accordingly, a general aspect of the present subject matter is to provide a tool that can increase the efficiency and thereby decrease the cost of an HVAC system. Additional aspects and advantages of the invention will be set forth in part in the following description, or may be obvious from the description, or may be learned through practice of the invention.

In an exemplary embodiment, a template for locating the placement of vents for an HVAC system is provided. The template has a body defining a first set of parallel edges and also a rectangular aperture therein. Beveled lips are disposed at each of the parallel edges to allow the body to be positionable on a first surface, such as a floor, while one of the beveled lips is pressed against a second perpendicular surface, such as a wall. A set of walls of the rectangular aperture run parallel with the parallel edges. In this manner, the rectangular aperture may be used to define a location of a vent for an HVAC system on the first surface that would be parallel to a line where the first surface and the second surface converge.

For example, for the defining of a placement of a vent on the floor or subfloor, the template may be laid on the floor or subfloor and pressed against the studs for a wall, the wall itself, or the molding, so that the beveled lip of the body of the template is placed firmly against such studs, wall, or molding. The rectangular aperture is placed within the body at such a distance from the beveled lips and the parallel edges that, once a position is marked, it should be outside the range of the wall and any baseboard, while still not interfering with any travel lane within the building. In some embodiments, the rectangular aperture may be positioned closer to one of the first set of parallel edges to accommodate for different variables for an installation site. Such variables include the sizes of different baseboards and whether the sheetrock or baseboard is already placed on the wall.

The rectangular aperture may be formed by parallel longitudinal walls in the body that run parallel to the first set of parallel edges and latitudinal walls that run perpendicular to the first set of parallel edges. To accommodate for different sized vents, the template may include adjustment apertures defined within the body that permit the defining of locations of a large number of different sizes and types of vents or boots. For example, at least one longitudinal-extending aperture may be defined by the body beside and in parallel with one of the latitudinal walls to accommodate the defining of a location of a vent having a longer length than is provided by the rectangular aperture. Similarly, at least one latitudinal-extending aperture may also be defined within the body beside and in parallel with one of the longitudinal walls to accommodate the defining of a location of a vent or boot having a larger width than provided by the rectangular aperture. At least one latitudinal-shortening aperture may also be defined by the body beside and in parallel with one of the latitudinal walls to accommodate the defining of a location of a vent having a smaller width than can be provided by the rectangular aperture. Further, a vent metrics system that runs along the longitudinal walls may be used to help define locations for vents having a shorter length than is provided by the rectangular aperture.

The rectangular aperture, as well as any adjustment apertures defined within the body of the template may also be used to site locations of supply vents, which are placed on walls of a building instead of the floor. To help define a return vent for an HVAC system, the body of the template may also include at least one return vent-marking aperture for marking the baseline for a return vent register of an HVAC system.

In some embodiments, the template may be made of a rectangular body in which a second set of parallel edges run perpendicular to the first set of parallel edges. In such an embodiment, the body, including one of the beveled lips, may define at least one truss-marking aperture for marking the location of a ceiling vent for an HVAC system. In such embodiments, there may be multiple truss marking apertures defined within the body. Such truss marking apertures will be defined at sufficient distance from a setting edge of the second set of parallel edges so that the beveled lip in which the truss markings are at least partially defined may be pressed against the truss while the setting edge is pressed against the wall. Once such placement is accomplished, a marking device may be inserted into the appropriate truss-marking aperture to mark the location for the installation of the ceiling vent or boot.

In another embodiment, a template for locating the placement of boots for an HVAC system may be provided that has a body which defines a first set of parallel edges. Longitudinal and latitudinal walls of a rectangular aperture may be defined within the body with the longitudinal walls running parallel to the first set of parallel edges and the latitudinal walls running perpendicular to the first set of parallel edges. The rectangular aperture will be usable to define a location for a vent of an HVAC system on at least one of the floor or wall. Further, at least one adjustment aperture may be defined by the body beside at least one of the latitudinal or longitudinal walls to accommodate the defining of a location of a vent which may have a different width or length than is provided by the rectangular aperture.

As stated above, the body may define multiple adjustment apertures within it. The adjustment apertures may be longitudinal-extending apertures that run parallel to the latitudinal walls to accommodate the defining of a location of a vent that has a longer length than is provided by the rectangular aperture and/or the adjustment apertures may be latitudinal-extending apertures that are parallel to the longitudinal walls to define location of vents that have a larger width than is provided by the rectangular apertures. Further, the adjustment apertures may include at least one latitudinal-shortening aperture that is parallel with one of the latitudinal walls to accommodate the defining of the location of a vent having a smaller width than provided by the rectangular aperture.

In such an embodiment, the rectangular aperture may be positioned closer to one edge of the first set of parallel edges to help accommodate for different size moldings as well as widths of walls. Also, each of the first set of parallel edges may help form a beveled lip. Truss marking apertures for marking location of ceiling vents as well as return vent-marking apertures for marking the baseline of return vents may also be defined by the body of the template.

A further embodiment has a template for locating the placement of a vent for an HVAC system having a rectangular body defining a first set of parallel edges and a second set of parallel edges. Longitudinal and latitudinal walls define a rectangular aperture within the rectangular body. The longitudinal walls run parallel to the first set of parallel edges, and latitudinal walls run parallel to the second set of parallel edges. At least one longitudinal-extending aperture is defined by the rectangular body beside and in parallel with one of the latitudinal walls to accommodate the defining of a location for a vent having a longer length than provided by the rectangular aperture. Further, at least one latitudinal-extending aperture is defined by the rectangular body beside and in parallel with one of the longitudinal walls to accommodate the defining of a location for a vent having a larger width than provided by the rectangular aperture. At least one of the latitudinal-shortening aperture is defined by the rectangular body beside and in parallel with one of the latitudinal walls to accommodate the defining of a location for a vent having a smaller width than provided by the rectangular aperture. A beveled lip is disposed on each of the parallel edges of the first set of parallel edges. At least one truss-marking aperture is defined by the rectangular body and one of the beveled lips for marking the location of a ceiling vent. Further, at least one return vent-marking aperture is defined by the rectangular body for marking the baseline of a return vent. The beveled lips allow the rectangular body to be positioned on a first surface while one of the beveled lips is pressed against a second surface perpendicular to the first surface. The rectangular aperture may then be used to define a location of a vent for an HVAC system on the first surface that is parallel to a line where the first surface and the second surface converge.

All the features of the subject matter will be described in greater detail through the use of the appended figures.

DETAILED DESCRIPTION

Reference will now be made in detail to the presently preferred embodiments of the invention, one or more examples of which are shown in the figures. Each example is provided to explain the invention, and not meant as a limitation of the invention. In fact, features illustrated or described as part of one embodiment can be used with another embodiment to yield still a third embodiment. It is intended that the present invention covers such modifications and variations.

Figure 1:
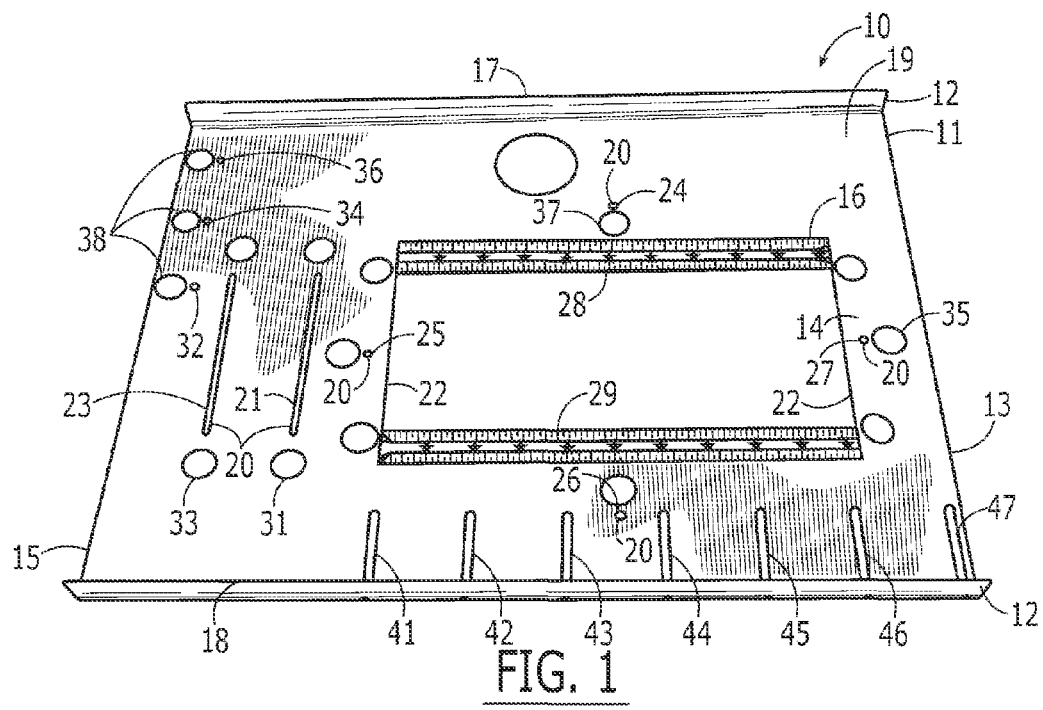
FIG. 1 shows a perspective view of an embodiment of the template according to the present invention.
Figure 2:
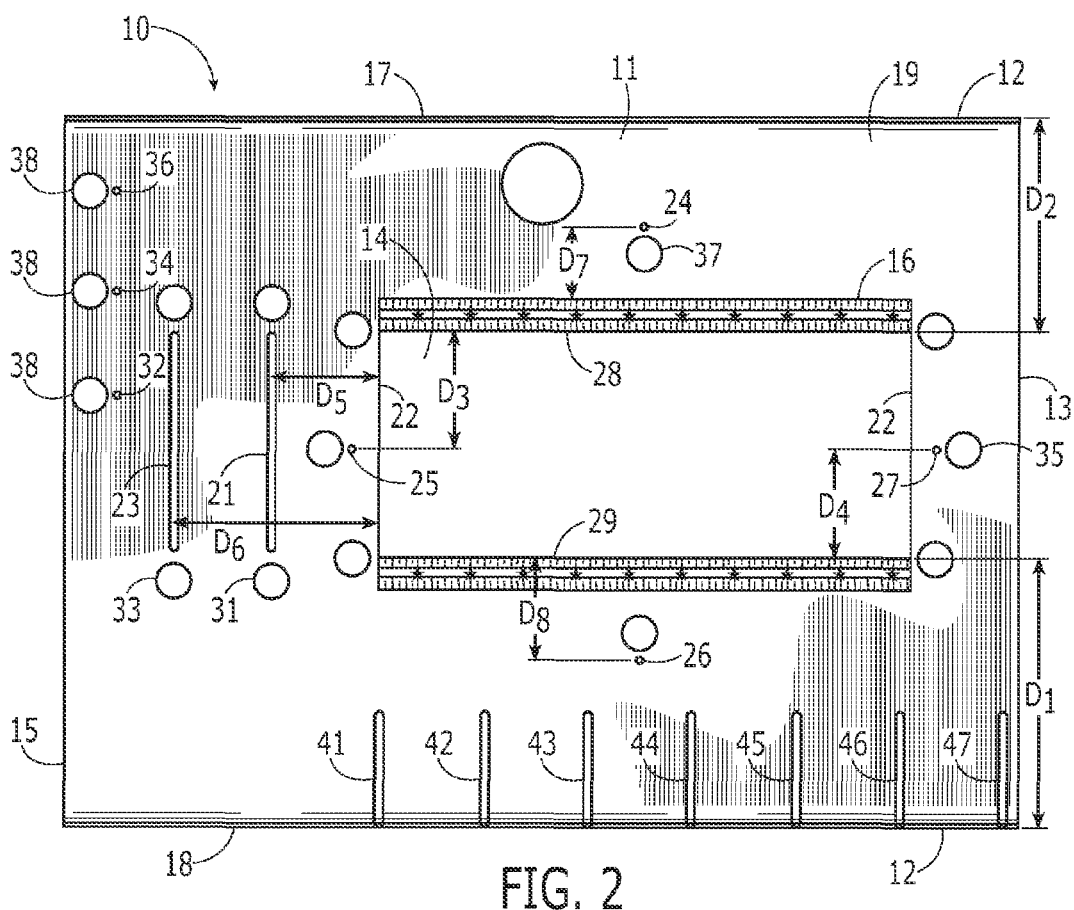
FIG. 2 shows a top view of the template of FIG. 1.
Figure 3:
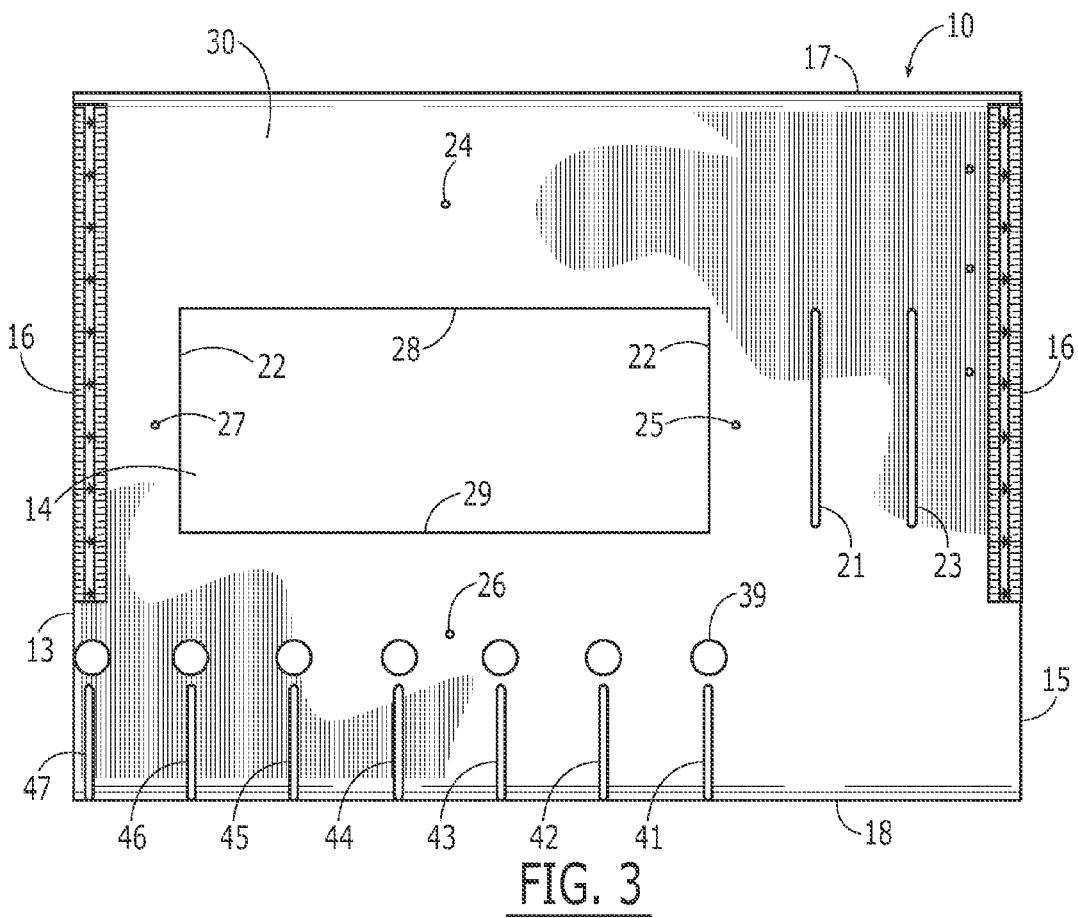
FIG. 3 shows a bottom view of the template of FIG. 2.

FIGS. 1, 2 and 3 illustrate a perspective view, top view, and bottom view of a template, generally 10, used for the installation of boots or vents within a building for an HVAC system. The exemplary embodiment of the template 10 may serve up to three functions in designating the location of HVAC boots or vents. Thus, if desired, the template can be used to locate such boots on a floor, ceiling, and/or wall. The template 10 has a body 11 made of a rigid and durable material. The body 11 may be constructed of a metal, wood, hard plastic, fiber glass, etc. The body 11 has a plurality of apertures (described below) disposed therein that are used to locate and designate positions for vents on a floor, ceiling, or wall of a facility in which an HVAC system is being installed. The body 11 forms a first set of parallel edges 17, 18 along two sides of the body 11. In this particular embodiment, beveled lips 12 are formed along the parallel edges 17, 18, with the beveled lips 12 and the parallel edges 17, 18 running in a longitudinal direction along the body 11.

FIGS. 1, 2, and 3 illustrate different sets of apertures within the body 11 of the template 10 that can be used to mark placements for different vents at different locations. In particular, the body 11 defines a rectangular aperture 14 to define locations for vents on a floor or wall. Adjustment apertures also defined by the body 11 of the template 10 may be used in combination with the rectangular aperture 14 to define such locations. The body 11 also forms vent-marking apertures 32, 34, 36 therein to aid in marking the base line for a return vent on a wall. Further, the body 11 of the template 10 defines truss marking apertures 41–47 therein to aid in the marking of locations of vents in a ceiling. The uses of these apertures are explained further below.

For the use in the installation of vents on a floor, the body 11 of the template 10 defines the rectangular aperture 14 therein. The rectangular aperture 14 is located generally in the middle of the body 11 between the parallel edges 17, 18. The body 11 forms parallel longitudinal walls 28, 29 and parallel latitudinal walls 22 that are perpendicular to the parallel longitudinal walls 28, 29 to define the rectangular aperture 14. The lengths of the longitudinal walls 28, 29 and the latitudinal walls 22 may vary depending on the end use of the template 10. However, it may be desirable to make the rectangular aperture 14 large enough to accommodate a standard vent register having the measurements of 4"×10", although other sizes are of course useful as well. To accommodate such a vent register, the rectangular aperture 14 itself should be a little bit larger than the actual 4"×10" measurement to ensure that there is adequate space to allow for the 4"×10" vent register to fit into the location that has been designated by the template 10 and subsequently cut out. For example, rectangular aperture 14 may have a 4¼"×10¼" measurement. For an embodiment where rectangular aperture 14 has a 4¼"×10¼" measurement, the longitudinal walls 28, 29 will measure 10¼ while the latitudinal walls 22 will measure 4¼".

To use the template 10 to define the location for a standard vent register on a floor using the rectangular aperture 14, the body 11 may be placed on the floor so that the front side 19 of body 11 is facing upward as shown in FIGS. 1 and 2. To define the location near a wall within the building, the template 10 is slid up against the wall so that either the beveled lip at edge 17 or the beveled lip at edge 18 is abutted against the wall. The location of the vent register can then be designated by tracing around the longitudinal walls 28, 29 and the latitudinal walls 22 of the rectangular aperture 14 with a pencil or some other marking device. In this manner, a worker will know where to cut a hole in the floor for the standard size vent register.

The template 10 may be used in new homes under construction, finished new homes, as well as existing older homes while still ensuring that the floor vent is at an adequate distance away from the wall to accommodate different size molding or baseboards. To accommodate for different size molding or baseboards to be placed in a house or to accommodate for both the width of the sheetrock as well as the width of the baseboard and molding in a new house under construction, the rectangle 14 is placed off center when comparing the distances from the longitudinal walls 28, 29 to the parallel edges 17, 18.

As can be seen from FIG. 2, the distance $D_1$ between longitudinal wall 29 and parallel edge 18 is greater than the distance $D_2$ between longitudinal wall 28 and parallel edge 17. Depending on the situation, either parallel edge 17, 18 with its beveled lip 12, may be abutted against a wall to allow the defining of a location of a floor vent. For example, in new homes close to being finished or in new homes under construction where either a large molding or baseboard is to be installed, or perhaps the sheetrock has not been installed against the wall studs, the beveled lip 12 at parallel edge 18 will be placed against the wall or wall studs for the defining of the location for the vent on the floor. In this manner, the larger distance $D_1$ from the parallel edge 18 to the longitudinal wall 29, accommodates for the width of the large baseboard or for the width of the baseboard and sheetrock to ensure that the vent is not placed too close to the wall requiring either a re-cut of the vent opening within the floor or a readjustment of the baseboard to accommodate the vent register.

For installations where a small baseboard will be used, or within houses with a baseboard already installed, the template 10 may be turned around so that parallel edge 17 abuts against the wall or baseboard for defining the location of a vent. Since the distance $D_2$ between longitudinal wall 28 and the parallel edge 17 is shorter than distance $D_1$ between longitudinal wall 29 and parallel edge 18, the designation of the location for a vent is not placed too far from the wall preventing the vent register from extending into a well traveled area of the house or building. As can be seen from FIG. 2, longitudinal walls 28, 29 run parallel to the parallel edges 17,18. This alignment helps to ensure that the vent register will run parallel to the wall or baseboard and not appear to be crooked. In some embodiments, the distance $D_1$ may be 5" and the distance $D_2$ may be 4". However, other distances may be utilized with both distance $D_1$ and $D_2$.

The beveled lips 12 can be useful in locating vents on the floor for several reasons. Because the beveled lips 12 turn upward from the face 19 of the body 11, the beveled lips 12 may be pressed against the wall or some other surface when locating the placement for the vent. The beveled lip creates a larger area to press against the wall, wall studs, or molding and will not slide into crevasses between the wall, wall studs, or molding in the floor that could create inaccurate and crooked placements of the vent in the floor. The length of the rectangular body 11 along the parallel edges 17, 18 along with the beveled lips 12, allow the template 10 to be slid along the floor and the wall without catching template 10 in any crevasses as described above or snagging it on the wall or floor. Such a design helps to increase the efficiency of defining locations for the vents within a home, office, or other building. Also, the beveled lip 12 which is located on the parallel edge distal from the wall may be used as a handle to allow easy movement of the template 10 along a wall or wall studs. The length of the parallel edges is long enough so that, in new construction sites, the template 10 will always be in contact with a wall stud based on standard placements of the wall studs to ensure that the template 10 may be easily slid along an unfinished wall. In this manner, the beveled lips 12 may firmly abut against a wall or stud to ensure that the template 10 will properly designate a location for the vent on the floor.

The template 10, even with the standard 4"×10" rectangular aperture 14, may be used to locate vents of varying sizes through the use of adjustment apertures 20, also defined in the body 11 and, if necessary, through the use of a vent metrics system 16 placed along the longitudinal walls 28, 29. The adjustment apertures 20 may be used to lengthen the latitudinal widths for accommodating wider or thinner vents. Further, the adjustment apertures 20 may also be used to lengthen the longitudinal sides of a vent designation to accommodate longer vents. For example, latitudinal-shortening apertures 25, 27 may be used to define shorter latitudinal widths that are provided by latitudinal walls 22 to accommodate a vent having a smaller width. In the embodiment shown in FIGS. 1 and 2, latitudinal-shortening aperture 25 would be used in combination with longitudinal wall 28 to define a vent location positioned at a distance $D_2$ from a wall or baseboard for a vent having a width that corresponds to distance $D_3$, while latitudinal-shortening aperture 27 would be used in combination with longitudinal wall 29 to define a location for a vent at a distance $D_1$ from a wall or baseboard where the vent register to be installed has a width that corresponds to distance $D_4$.

To define the location for a vent with a smaller width located at a distance $D_2$ from a wall, stud, or molding, the template 10 will be placed so that the beveled lip 12 of the parallel edge 17 abuts against the wall, stud, or molding, and a marking device is used to trace along longitudinal wall 28 and at least partially along the two latitudinal walls 22 starting from their intersection with latitudinal wall 28. The marking device, such as a pencil, may then be placed in the latitudinal-shortening aperture 25. The template 10 and the marking device may then be slid along the floor with a beveled lip 12 of parallel edge 17 still abutting the wall to trace the outside longitudinal length for the longitudinal side of the vent distal from the wall. In the same manner, longitudinal wall 29 and latitudinal-shortening aperture 27 may be used to find a location for a vent that would be a distance $D_1$ from a wall, stud, or molding.

For an embodiment that has a rectangular aperture 14 for a standard vent register having the dimensions of 4"×10", the latitudinal-shortening apertures 25, 27 may be used to locate a position for vent registers measuring 2"×10", for example. In such a case, $D_3$ would be equal to 2¼" for latitudinal-shortening aperture 25, and $D_4$ would be equal to 2¼" for latitudinal-shortening aperture 27. By having distance $D_3$ and distance $D_4$ being equal to 2¼" along with the longitudinal walls 28, 29 being equal to 10¼", then the location defined by the latitudinal-shortening apertures 25, 27 and the longitudinal walls 28, 29 will be large enough to accommodate a vent register having the dimensions of 2"×10". While FIGS. 1 and 2 only show one corresponding latitudinal-shortening aperture 25, 27 for each respective longitudinal wall 28, 29, multiple shortening apertures may be placed along each latitudinal wall 22 to accommodate other various sizes of vents, which may be smaller than the length associated with the latitudinal walls 22.

Adjustment apertures 20 may also include latitudinal-extending apertures 24, 26. Latitudinal-extending apertures 24, 26 in the embodiments shown in FIGS. 1 and 2 are located beside the longitudinal walls that define the rectangular aperture 14 within the body 11 of the template 10. The latitudinal-extending apertures 24, 26 are used to define locations, for vents within a building which has a larger width than is provided by the rectangular aperture 14. For example, latitudinal-extending aperture 26 may be used in combination with longitudinal wall 28 to define a location for a vent positioned at distance $D_2$ from a wall, stud, or baseboard, while latitudinal-extending aperture 24 may be used in combination with longitudinal wall 29 to define a location for a vent register that is located at a distance $D_1$ from a wall, stud, or baseboard. The latitudinal-extending apertures 24, 26 may be used in a similar manner as the latitudinal-shortening apertures, 25, 27 to define the location of a vent.

For locating a vent at a distance $D_2$ from a wall, stud, or baseboard, the beveled lip 12 at the parallel edge 17 may be placed against the wall, stud, or baseboard at a desired location. A marking device such as a pencil may then follow along latitudinal walls 22 and longitudinal wall 28 to define a portion of the location for the vent. The marking device may then be put into the latitudinal-extending aperture 26 and both the template 10 and the marking device may be slid in either direction along the wall so that the marked location of the outer wall of the vents distal from the wall will be well enough defined. After the line for this outer marking is made with the help of latitudinal-extending aperture 26, the template 10 may be rotated so that the beveled lip at the parallel edge 17 or parallel edge 18 may be used to extend the markings made along latitudinal walls 22 up to the outer marking. If the body 11 of the template 10 is rectangular in shape as shown in FIGS. 1 and 2, then the second set of parallel edges 13, 15 may also be used to extend the lines drawn with the help of latitudinal walls 22. In a similar manner, latitudinal-extending aperture 24 may be used in combination with longitudinal wall 29 to define a location for a vent register that is a distance $D_1$ from a wall, stud, or baseboard.

Latitudinal-extending aperture 24 can extend the defined width for a vent by a distance $D_7$, while latitudinal-extending aperture 26 may extend the defined width for a designated location for a vent by a distance $D_8$. Vent registers may commonly have the dimensions of 6"×10". For a body 11 of the template 10 which defines a rectangular aperture 14 for a standard 4"×10" vent register, the distance $D_7$ and the distance $D_8$ would be equal to 2". In this manner, latitudinal-extending apertures 24, 26 are located at 6¼" from the respective corresponding longitudinal walls 29, 28. At the same time, longitudinal walls 28 and 29 may be 10¼" so that a large enough area is provided for a 6"×10" vent. Multiple latitudinal-extending apertures may be defined within the body 11 of the template 10.

As stated earlier, adjustment apertures 20 are also provided to extend the longitudinal length of the markings to accommodate a vent having a longer length than is provided by rectangular aperture 14. First longitudinal-extending aperture 21 is formed within the body 11 of the template 10 and runs parallel to the latitudinal walls 22. First longitudinal-extending aperture 21 can extend the longitudinal length of the area defined for a location of a vent by the distance $D_5$. In a similar manner, second longitudinal-extending aperture 23 is also formed in the body 11 of the template 10 and runs parallel to the latitudinal walls 22. The second longitudinal-extending aperture 23 can extend the longitudinal length of an area designated for the location of a vent even further than the first longitudinal-extending aperture 21 by a distance $D_6$. In most embodiments, it may be beneficial to have the longitudinal-extending apertures 21, 23 have an elongated length in the form of a slot that is at least the length of longitudinal walls 22 so that it will be easy to draw or define the mark for the designation of that side of the vent or boot.

To use the longitudinal-extending apertures 21, 23, the template 10 may be placed on the floor with one of the parallel edges 17, 18 and its corresponding beveled lip 12 placed against the wall depending on the distance at which the user would like to place the vent or boot. Once the template 10 is in a desired location, the outline of three sides of the position for the vent may be marked. The marking device may be run along the longitudinal walls 28, 29 and the latitudinal wall 22 which is distal from the longitudinal-extending apertures 21, 23. At this point, depending on the size of the vent register, the marking device may be placed within one of the first or second longitudinal-extending apertures 21, 23 to draw the other latitudinal marking for defining the location for the vent. The template 10 may then be slid along the wall towards the marking made in the longitudinal-extending aperture 21 or 23 so that the longitudinal markings may be extended to connect the longitudinal drawn lines to the latitudinal drawn line drawn through the longitudinal-extending aperture 21 or 23.

Often vents which measure 4"×12" or 4"×14" may be used in an HVAC system. If body 11 of template 10 defines a rectangular aperture 14 which may be used to define a location for a 4"×10" standard vent, then longitudinal-extending aperture 21 may be used to help mark the location for a 4"×12" vent and longitudinal-extending aperture 23 may be used to help mark a location for a 4"×14" vent. To ensure that there is adequate space to allow for the 4"×12" vent or 4"×14" vent to fit into the location that has been designated by the template 10 and subsequently cut out, the defined location may be larger than the those measurements. For example, the location for a 4"×12" vent may be defined as 4¼"×12¼", while the location for a 4"×14" vent may be defined as 4¼"×14¼". If the longitudinal walls 28, 29 are 10¼" long, then distance $D_5$ would measure 2", while distance $D_6$ would measure 4". In such an embodiment, latitudinal walls 22 and longitudinal-extending apertures 21, 23 would have a length 4¼" so as to allow enough space for the insertion of a 4"×12" vent or a 4"×14" vent, respectively. Other embodiments of the longitudinal-extending apertures may also be employed within the template 10. Also, a larger number of such longitudinal-extending apertures may be formed within the body 11 of the template 10.

Longitudinal-extending apertures 21, 23 may be used in combination with any of the latitudinal-shortening apertures 25, 27 or latitudinal-extending apertures 24, 26 which are disposed in the template 10 to create any number of combinations of markings to accommodate many different sized vents. Also, the vent metrics system 16 attached along the longitudinal walls 28, 29 can be used to help mark vent locations for vents having a shorter length than is provided by the longitudinal walls 28, 29. The vent metrics system 16 has a measurement system (such as inches or centimeters) disposed thereon and can be used to mark a specific length quantified by the measuring system. For example, if a vent is a 4"×8" vent, then a template having a rectangular aperture 14 of 10¼"×4¼" may be placed in the desired position and one of the latitudinal walls 22 may be used to mark one side of the position for the vent register. The metrics system 16 on the sides of longitudinal walls 28 and 29 can then be used to allow the marking of two other sides to 8¼". The template can them be slid down to allow the drawing in of the fourth side of the position for the vent register.

The vent metrics system 16 also may include measuring units applied to the back 30 of the body 11 (see FIG. 3) or at some other location on the body 11 of the template 10. The metrics system 16 on the back 30 of the body 11 may be used as a measuring straight edge that can be utilized for different tasks, including being used to extend the distance from a wall at which the location of a vent will be placed on a floor, or visa versa.

Figure 4A:
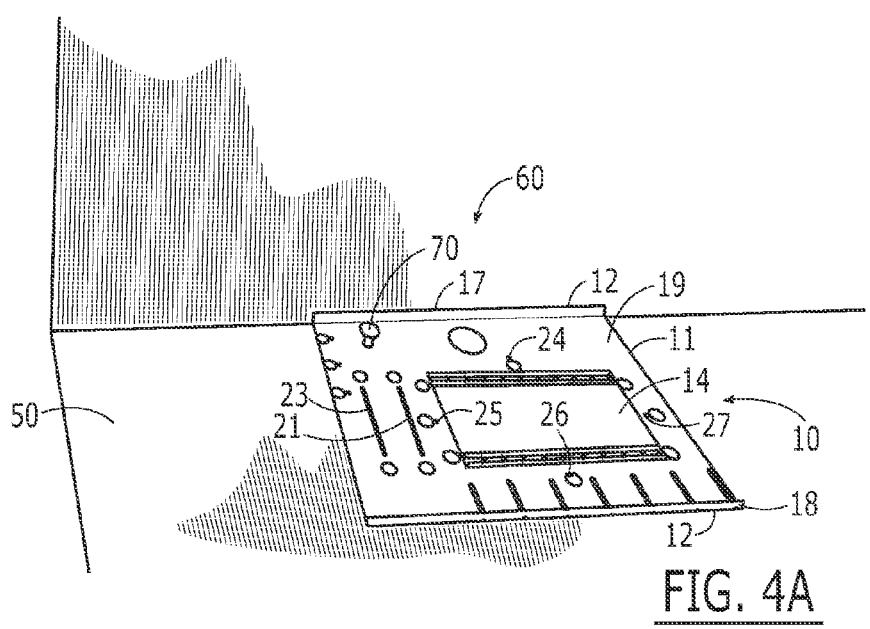
FIG. 4A shows an embodiment of the template of FIG. 1 in use on a floor of a building.

FIG. 4A illustrates the use of a template 10 for marking a position for a vent on a floor 50 within a building. As described above through FIGS. 1 and 2, the template 10 is placed upon a floor 50 with a face 19 of the body 11 facing upward. The body 11 has parallel edges 17, 18 and beveled lips 12 disposed at those parallel edges 17, 18. The template 10 is placed on the floor 50 in such a manner that the beveled lip 12 at the parallel edge 17 is abutted against a wall 60. As described above, rectangular aperture 14 and adjustment apertures 21, 23, 24, 25, 26, and 27 may be used in any combination to mark the correct location for a vent, while taking into consideration the baseboard, which may be installed or is installed along the floor and wall. Such a place would also allow for the proper airflow from the vent of the HVAC system while not interfering with any travel lanes within the building. When using the adjustment apertures 21, 23, 24, 25, 26, and 27 which are defined by the body 11, the template 10 should be capable of sliding along the floor and wall. To improve the efficiency of sliding the template along the wall, a handle 70 may be attached to the body 11 of the template 10. The handle 70 may be permanently attached to the body 11 of the template 10, or it may be removable. The handle allows for the template to be easily moved from side to side along the wall and floor to increase the efficiency of drawing or marking the position of the vent.

Through the use of this template as described above, any number of locations may be defined for almost any size vent. In a similar manner, the rectangular aperture 14 and the adjustment apertures 20 as well as the metrics system 16 may be used to mark a position on the wall for almost any size vent for an HVAC system. Instead of having the template laid on the floor, it may be pressed up against the wall with one of the parallel edges 17, 18 with its beveled lip 12 residing against the floor. Different combinations of the rectangular aperture 14, adjustment apertures 20 and the matrix system 16 may be used to define a location for different size vents that will be placed on the wall.

In some embodiments like the ones shown in FIGS. 1 and 2, another use for marking registers on a wall can be performed with the template 10. In many HVAC systems today the return vent is located on the wall. It is important to ensure that the return vent is located in an appropriate position, while taking into consideration the possible pulling of dirt and dust from the floor as well as the location of any baseboard or molding placed around the bottom of the wall. To help ensure that a proper location is defined for a return vent, return vent-marking apertures 32, 34, 36 are defined by the body 11 of the template 10. The return vent-marking apertures may be used to mark a baseline for the bottom a return vent.

Any suitable distance which meets the requirement for the placement of a return vent may be used to create a return vent-marking aperture. A standard distance for such return vents are 8", 10", and 12" from the floor. The different distances may depend on the type of environment in which the HVAC system is being installed as well as the type of molding or baseboard which is being used. In the embodiment shown in FIGS. 1 and 2, the return vent-marking aperture 32 is located 8" from the parallel edge 18, return vent-marking aperture 34 is located 10" from the parallel edge 18, and return vent-marking aperture 36 is located 12" from the parallel edge 18.

In use, the template 10 is placed up against the wall so that the face 19 of the body 11 is facing outward. The parallel edge 18 with its beveled lip is placed against the floor. Once a distance is decided upon for the placement of the base of the return vent, a marking device may be placed in the appropriate return vent-marking aperture and the template 10 may be slid across the floor in the appropriate direction to draw the baseline for the return vent. Appropriate actions can then be taken to install the return vent based on the defined location designated through the use of the template 10.

Figure 4B:
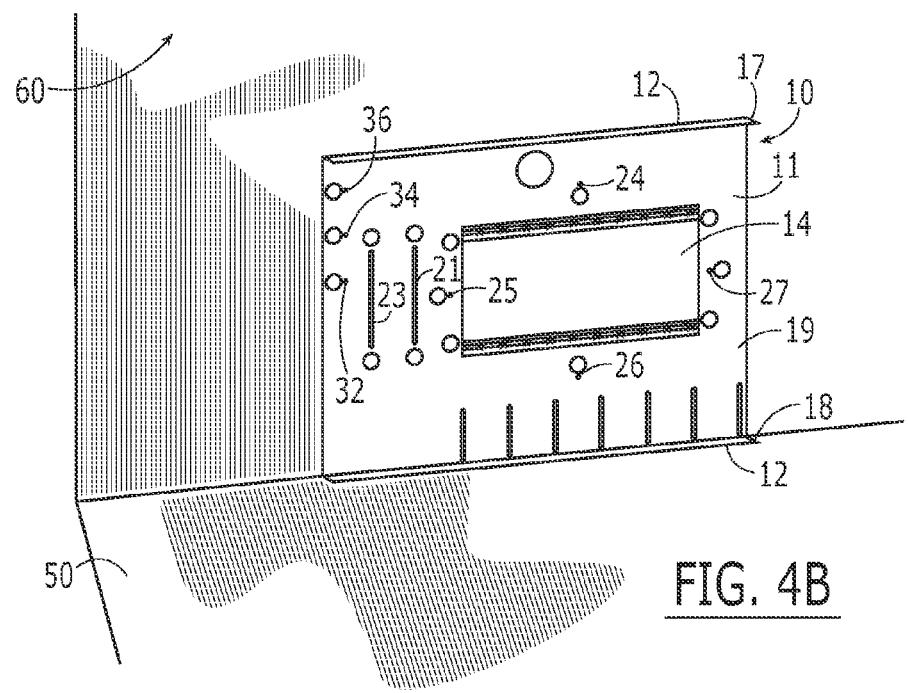
FIG. 4B shows an embodiment of the template of FIG. 1 in use against a wall of a building.

FIG. 4B illustrates a template 10 in a position for use for locating vents along a wall 60. The template can be used for locating a normal vent for supplying air into the room or may also be used to locate a return vent for withdrawing air out of the room. Template 10 having a body 11 may be placed against a wall 60 with its face 19 facing outward into the room. The body 11 forms two parallel edges 17, 18. At these parallel edges 17, 18 two beveled lips 12 are formed by the body 11. To mark a position for a vent for supplying air into a room when the body 11 is placed against the wall 60 either beveled lip 12 of the parallel edges 17, 18 may be set against the floor depending upon the distance at which the vent register is to be located. Through the use the rectangular aperture 14 and adjustment apertures 21, 22, 24, 25, 26, and 27 define in the body 11, markings for positions of a large number of sizes and types of vent registers can be accomplished as described above.

Further, through the use of return vent-marking apertures 32, 34, 36 formed in the body 11, a baseline for a return vent may also be marked along a wall. For such a marking, the template 10 may be placed against the wall 60 with the face 19 of the body 11 facing outward. The parallel edge 18 with its beveled lip 12 that is distal from the return vent-marking apertures rest against the floor 50. Any number of return vent-marking apertures may be placed within the body 11. In the embodiment shown, for example, three return vent-marking apertures 32, 34, 36 are present. These return vent-marking apertures 32, 34, 36 are positioned at a distance to allow for a proper positioning of the return vents. For example, return vent-marking aperture 32 may be 8" away from the parallel edge 18, return vent-marking aperture 34 may be 10" away from the parallel edge 18, and return vent-marking aperture 36 may be 12" away from the parallel edge 18. Depending on the desired distance, once the template 10 is in proper position, a marking device may be inserted into the appropriate return vent-marking aperture to designate the baseline for the return vent at the desired distance. The template 10 may then be slid along the floor 50 and the wall 60 pushing the marking device along allowing for an accurate baseline for the return vent that is parallel to the floor 50.

A third set of marking apertures can be illustrated through the use of FIGS. 1, 2 and 3 for use in marking ceiling locations for boots or vents. Truss marking apertures 41–47 are defined by the body 11 of the template 10 on an end proximal to the parallel edge 18 and perpendicular thereto. The truss marking apertures 41–47 extend into the beveled lip 12 of the parallel edge 18 to a certain extent. The template and the truss marking apertures are useful in the placement of ceiling boots for the HVAC system in new homes that are under construction.

FIG. 3 shows the backside 30 of the template 10. The backside 30 is the side which faces outward when the template is in use for marking the position for ceiling boots for an HVAC system. The truss marking apertures 41–47 are placed at specified distances away from a setting edge 15 of the parallel edges 13, 15. The different distances between the setting edge 15 and the respective truss marking apertures 41–47 are to set the ceiling boot for an HVAC system at different locations along the ceiling, thereby taking into account airflow as well as any molding which is placed along the ceiling. With an HVAC system, the installer wants to ensure that the air is disbursed from the vents in an effective manner to create proper airflow. To create this proper airflow, the boots and vents of the HVAC system are normally placed close to the wall. At the same time, an installer must take into consideration the size of the molding to be installed around the ceiling. Due to the large number of types and sizes of moldings used today in different types of buildings, the installer wants to ensure that the ceiling boot is placed in an area that would not require an alteration to the molding that is being installed or not require a moving of the ceiling boot after installation of the sheetrock or molding on the ceiling.

The number of truss marking apertures and the spacing of the apertures may vary on different types of templates. In the embodiments shown in FIGS. 1–3, the body 11 of the template 10 forms seven truss marking apertures 41–47. These seven different truss marking apertures can be spaced at different intervals. However, commonly there are seven placements for a ceiling boot for an HVAC system. These placements as stated before depend on the airflow created by the boot as well as taking into consideration the type of molding which is placed between the wall and ceiling. These placements may be at some or all at 6", 8", 10", 12", 14", 16", and/or 18". On template 10, the body 11 defines truss marking aperture 41 at a distance of 6" away from the setting edge 15 of the parallel edges 13, 15. Body 11 defines the other truss markings 42–47 at two inch intervals from the preceding truss marking. Thereby, truss marking 42 is 8" away from setting edge 15, truss marking aperture 43 is 10" away from setting edge 15, truss marking aperture 44 is 12" away from setting edge 15, truss marking aperture 45 is 14" away from setting edge 15, truss marking aperture 46 is 16" away from setting edge 15, and truss marking aperture 47 is 18" away from setting edge 15. By using the different truss marking apertures 41–47, the location for the ceiling boot can be defined that still permits the proper airflow of the HVAC system, while taking into consideration the different sizes of molding, which is currently available on the market.

Figure 4C:
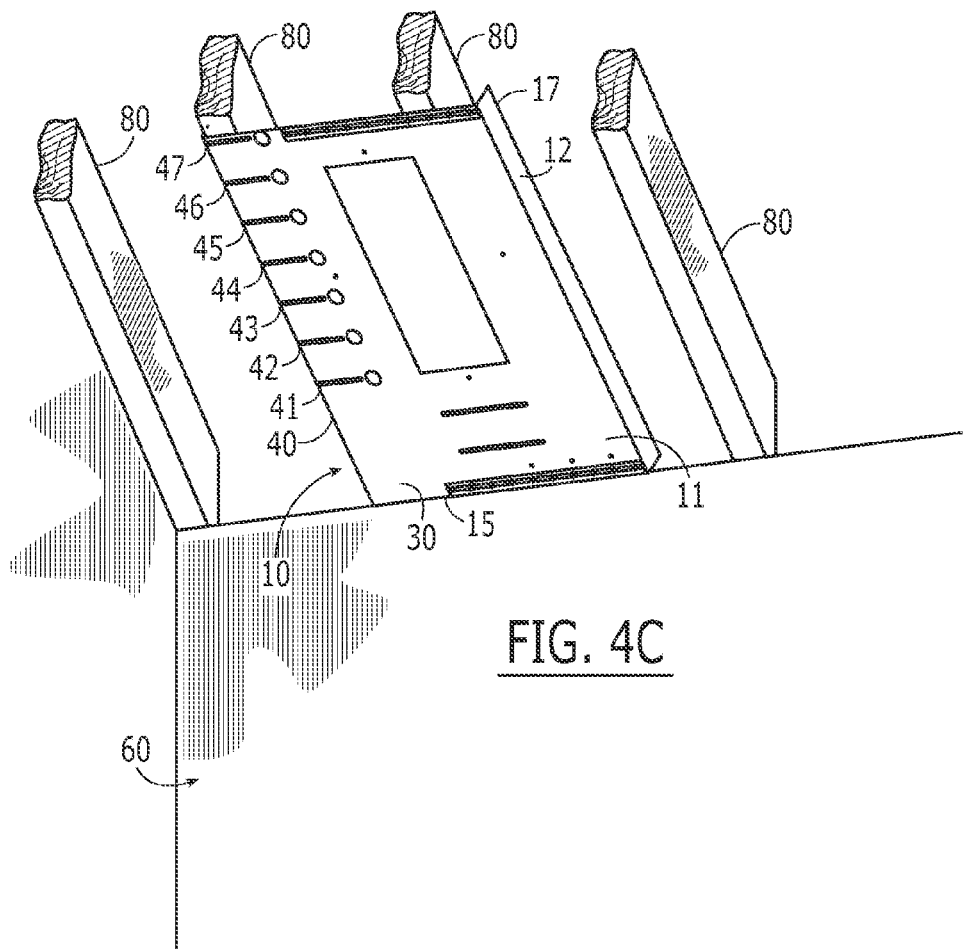
FIG. 4C illustrates an embodiment of the template of FIG. 1 in use against ceiling trusses in a building under construction.

The use of the template for marking ceiling vents within a new house under construction is better explained through the illustrations shown if FIG. 4C. When a new house is being constructed, the walls 60 are erected within the house and then ceiling trusses, which are used to support the floor above or the roof of the house, are placed upon the load-bearing walls to allow for the ceiling to be sheetrocked and to support an upper floor or roof. FIG. 4C shows a wall 60 with trusses 80 residing on top of the wall 60 and extending therefrom. At this point in the construction of the new home, it is advantageous to mark the location for any ceiling boot for the HVAC system and have it installed before the ceiling is sheetrocked. To properly locate the position for a ceiling boot for an HVAC system, you want to locate the boot so that the air that will be released therefrom can travel down the wall and circulate into the room. The template 10 may be used to find the proper placement for a ceiling boot that allows the proper circulation of the air and also takes into consideration any molding, which is planned to be installed at some future date once the house is nearing completion.

As described above, template 10 has pair of parallel edges 17, 18 of which the parallel edge 18 is not visible in FIG. 4C. At the parallel edges 17, 18 beveled lips 12 are formed by the body 11 of the template 10. The body 11 also forms a second set of parallel edges 13, 15 of which setting edge 15 may be used to abut the wall 60 when defining the location of a ceiling boot. The body 11 of the template 10 also defines a plurality of truss marking apertures 41–47, which are defined by positions proximal to the parallel edge 18 and overlapping bend 40 within the body 11 which is used to form the beveled lip 12 at the parallel edge 18. The truss marking apertures 41–47 run parallel to the setting edge 15.

Once the location of the ceiling boots are ready to be defined, the template may be placed on a truss 80 so that the lip of the parallel edge 318 abuts against the side of the truss 80 on which a ceiling boot will be attached. At the same time the setting edge 315 of the body 311 should rest against the wall 60 from which the trusses 80 extend. Depending on the size of the molding that will be installed at a later time once the construction is near completion, a marking device is used so as to mark a location of at least the baseline closest to the wall for the position of the ceiling boot of an HVAC system by running the marking device through the appropriate truss marking apertures 341–347. Once the appropriate location has been marked on one truss the template 310 may be moved to a second truss and in a similar manner the appropriate position may be marked through the use of the truss marking apertures 341–347 of the template 310. By having at least the baseline closest to the wall marked on the adjacent ceiling trusses 80, the person installing the ceiling boot will know where to attach the boot between the two trusses 80 that have been appropriately marked.

As can be seen in FIGS. 1–4, to help speed the process for deciding the appropriate locations for vents in different positions, labels 31, 33, 35, 37, 38, and 39 may be used to identify different apertures and features of the template, such labels can increase the speed and efficiency of the user when deciding locations for vents. The labels may be added such as stickers or other markings, or may be formed integral with the template, such as by molding, etc.

Through the use of the template described above, a user may spec a house for an HVAC system in a lot less time than conventional methods. In fact, through the use of the templates shown in FIGS. 1–4, the locations for the vents for an entire HVAC system may be located without using other locating tools and methods. However, this invention also includes embodiments which may not have all the features illustrated in FIGS. 1–4. It is possible that different combinations of the rectangular apertures, the adjustment apertures, the marking apertures and the beveled lips along the parallel edges may be used in different embodiments to create different templates or tools. For example, a different device may be used for floors, for walls, and for ceilings. Also, a combination floor and wall template may be made, and a separate template may be made for ceilings.

It will be appreciated by those skilled in the art that various modifications and variations can be made in the present invention without departing from the scope and spirit of the invention. It is intended that the present invention include such modifications and variations as come within the scope of the appended claims and their equivalents.

What is claimed:

1. A multi-functional template for locating the placement of multiple types of vents for an HVAC system, the placement being either within a first surface adjacent to a perpendicular second surface with the first and second surfaces converging at a line or in a ceiling along a roof truss structure, said template comprising:

a body defining a first set of parallel edges and a second set of parallel edges perpendicular to the first set of parallel edges, said body defining a rectangular aperture having a given size being disposed at a predetermined position within said body to locate the placement of the vent relative to said first set of parallel edges, wherein said predetermined position is defined so that said rectangular aperture is positioned closer to one edge of said first set of parallel edges, said body defining a plurality of adjustment apertures spaced from the rectangular aperture for defining a location of a vent having a longitudinally or latitudinally shorter or longer size than the given size of the rectangular aperture;

a beveled lip disposed at each of said edges of said first set of parallel edges, said beveled lips allowing said body to be positionable on the first surface while one of said beveled lips is pressed against the second surface, so that said rectangular aperture and said adjustment apertures are useable to define a location of the vent for the HVAC system on the first surface spaced from the line according to said predetermined position; and a plurality of truss marking apertures disposed along one of said first parallel edges adjacent the respective beveled lip, each of the truss marking apertures defining a distance from the second parallel edges to thereby define respective locations of a ceiling vent for the HVAC system.

2. A template as in claim 1, wherein said body defines longitudinal walls of said rectangular aperture that run parallel to said first set of parallel edges and latitudinal walls of said rectangular aperture that run perpendicular to said first set of parallel edges.

3. A template as in claim 2, wherein said longitudinal walls are longer in length than said latitudinal walls.

4. A template as in claim 3, wherein said adjustment apertures include at least one longitudinal-extending aperture defined by said body beside and in parallel with one of said latitudinal walls to accommodate the defining of a location for a vent having a longer length than provided by said rectangular aperture.

5. A template as in claim 3, wherein said adjustment apertures include at least one latitudinal-extending aperture defined by said body beside and in parallel with one of said longitudinal walls to accommodate the defining of a location for a vent having a larger width than provided by said rectangular aperture.

6. A template as in claim 3, wherein said adjustment apertures include at least one latitudinal-shortening aperture defined by said body beside and in parallel with one of said latitudinal walls to accommodate the defining of a location for a vent having a smaller width than provided by said rectangular aperture.

7. A template as in claim 2, further comprising measurement indicia disposed on said body to aid with the installation of said vents.

8. A template as in claim 7, wherein said measurement indicia includes measurement markings along said longitudinal walls to accommodate the defining of a location for a vent having a shorter length than provided by said rectangular aperture.

9. A template as in claim 1, wherein said truss marking apertures extend through the respective beveled lip.

10. A template as in claim 9, wherein said one of said edges of said second set of parallel edges provides a straight edge for marking the location of a ceiling vent in conjunction with the truss marking apertures.

11. A template as in claim 1, wherein said body defines a plurality of return vent-marking apertures for marking the base line for a return vent register for said HVAC system.

12. A template as in claim 1, wherein said body has a handle attached thereto.

13. A multi-functional template for locating the placement of multiple types of vents for an HVAC system, the placement being within at least one of a wall, floor or ceiling, said template comprising:
  a body defining a first set of parallel edges and a second set of parallel edges perpendicular to the first set of parallel edges;
  longitudinal and latitudinal walls of a rectangular aperture defined by said body at a predetermined position within said body, said longitudinal walls running parallel to said first set of parallel edges and said latitudinal walls running perpendicular to said first set of parallel edges;
  said rectangular aperture useable to define a location of the vent for the HVAC system on at least one of the floor or wall;
  a plurality of adjustment apertures defined by said body beside said latitudinal and longitudinal walls to accommodate the defining of a location for the vent having at least one of different width or length than provided by said rectangular aperature; and
  a plurality of truss marking apertures disposed along of said first parallel edges, each of the truss making apertures defining a distance from the second parallel edges to thereby define locations of a ceiling vent for the HVAC system.

14. A template as in claim 13, wherein said longitudinal walls are longer in length than said latitudinal walls.

15. A template as in claim 14, wherein said adjustment apertures comprise at least one longitudinal-extending aperture defined by said body beside and in parallel with one of said latitudinal walls to accommodate the defining of a location for a vent having a longer length than provided by said rectangular aperture.

16. A template as in claim 14, wherein said adjustment apertures comprise at least one latitudinal-extending aperture defined by said body beside and in parallel with one of said longitudinal walls to accommodate the defining of a location for a vent having a larger width than provided by said rectangular aperture.

17. A template as in claim 14, wherein said adjustment apertures comprise at least one latitudinal-shortening aperture defined by said body beside and in parallel with one of said latitudinal walls to accommodate the defining of a location for a vent having a smaller width than provided by said rectangular aperture.

18. A template as in claim 13, wherein said predetermined position is defined so that said rectangular aperture is positioned closer to one edge of said first set of parallel edges.

19. A template as in claim 13, wherein said body defines a plurality of return vent-marking apertures for marking the base line for a return vent register for said HVAC system.

20. A template as in claim 13, wherein a beveled lip is defined on each of said edges of said first set of parallel edges.

21. A template as in claim 13, wherein one of said edges of said second set of parallel edges provides a straight edge for marking the location of a ceiling vent.

22. A template as in claim 13, further comprising measurement indicia disposed on said body to aid with the installation of said vents.

23. A multi-functional template for locating the placement of multiple types of vents for an HVAC system, the placement being within a first surface adjacent to a perpendicular second surface with the first and second surfaces converging at a line or in a ceiling along a roof truss structure, said template comprising:
  a rectangular body defining a first set of parallel edges and a second set of parallel edges;
  longitudinal and latitudinal walls of a rectangular aperture defined by said rectangular body at a predetermined position within said rectangular body to locate the placement of the vent relative to said first set of parallel edges, said longitudinal walls running parallel to said first set of parallel edges and said latitudinal walls running parallel to said second set of parallel edges;
  at least one longitudinal-extending aperture is defined by said rectangular body beside and in parallel with one of said latitudinal walls to accommodate the defining of a location for a vent having a longer length than provided by said rectangular aperture;
  at least one latitudinal-extending aperture is defined by said rectangular body beside and in parallel with one of said longitudinal walls to accommodate the defining of a location for a vent having a larger width than provided by said rectangular aperture;
  at least one latitudinal-shortening aperture is defined by said rectangular body beside and in parallel with one of said latitudinal walls to accommodate the defining of a location for a vent having a smaller width than provided by said rectangular aperture;
  a beveled lip disposed at each of said edges of said first set of parallel edges;
  a plurality of truss-marking apertures defined by said rectangular body along one of said beveled lips, said truss-marking apertures located for marking the location of a ceiling vent of varying sizes relative to said second parallel edges;
  a plurality of return vent-marking aperture defined by said rectangular body, said return vent-marking apertures located for marking the base line for a return vent register of varying sizes relative to said first parallel edges; and
  said beveled lips allowing said rectangular body to be positionable on the first surface while one of said beveled lips is pressed against the second surface, so that said rectangular aperture is useable to define a location of the vent for an HVAC system on the first surface that is parallel to the line according to said predetermined position.

24. A template as in claim 23, wherein said longitudinal walls are longer in length than said latitudinal walls.

25. A multi-functional template for locating the placement of multiple types of vents for an HVAC system, the placement being within at least one of a wall, floor or ceiling, said template comprising a rectangular body defining a first set of parallel edges and a second set of parallel edges perpendicular to the first set of parallel edges, the body further defining a first set of apertures for marking locations for the vents in at least one of the wall or the floor and a second set of apertures for marking locations for the vents in the ceiling, said first set of apertures including a rectangular aperture, said first set of apertures further including multiple adjustment apertures for enlarging or reducing the size of the resulting aperture as compared to the rectangular aperture, and said second set of apertures including a plurality of truss marking apertures along one of the parallel edges each for defining a respective position of a ceiling vent on a roof truss.

26. A template as in claim 25, wherein said first set of apertures further include at least one return vent-marking aperture.

27. A template as in claim 25, wherein said body of said template has a beveled lip disposed at each of said first set of parallel edges.

\* \* \* \* \*